US012601538B2

(12) United States Patent
Park et al.

(10) Patent No.: US 12,601,538 B2
(45) Date of Patent: Apr. 14, 2026

(54) REFRIGERATOR

(71) Applicant: LG Electronics Inc., Seoul (KR)

(72) Inventors: Dongwoo Park, Seoul (KR); Juho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 18/196,564

(22) Filed: May 12, 2023

(65) Prior Publication Data

US 2023/0375256 A1     Nov. 23, 2023

(30) Foreign Application Priority Data

May 19, 2022     (KR) ........................ 10-2022-0061499

(51) Int. Cl.
| | |
|---|---|
| *F25D 23/02* | (2006.01) |
| *F25D 25/02* | (2006.01) |
| *A47B 88/457* | (2017.01) |
| *F16G 13/16* | (2006.01) |
| *F25D 27/00* | (2006.01) |
| *F25D 29/00* | (2006.01) |
| *H01R 13/627* | (2006.01) |

(52) U.S. Cl.
CPC ......... *F25D 25/025* (2013.01); *F25D 23/021* (2013.01); *A47B 88/457* (2017.01); *A47B 2210/175* (2013.01); *F16G 13/16* (2013.01); *F25D 27/00* (2013.01); *F25D 29/005* (2013.01); *F25D 2400/40* (2013.01); *H01R 13/6271* (2013.01); *H01R 13/6272* (2013.01)

(58) Field of Classification Search
CPC .. F25D 25/025; F25D 2400/40; F25D 23/021; F25D 29/005; F16G 13/16; H01R 13/6271; H01R 13/6272; A47B 2210/175; A47B 88/457

USPC ......................................................... 439/357
See application file for complete search history.

(56) References Cited

U.S. PATENT DOCUMENTS

| | | | | | |
|---|---|---|---|---|---|
| 3,573,716 A | * | 4/1971 | Garver | ................. | H01R 13/743 |
| | | | | | 439/353 |
| 3,651,446 A | * | 3/1972 | Sadogierski | ......... | H01R 13/741 |
| | | | | | 439/357 |

(Continued)

FOREIGN PATENT DOCUMENTS

| | | |
|---|---|---|
| EP | 3505853 | 7/2019 |
| EP | 3663686 | 6/2020 |

(Continued)

OTHER PUBLICATIONS

Extended European Search Report in European Appln. No. 23172712.4, mailed on Oct. 24, 2023, 10 pages.

*Primary Examiner* — Kimberley S Wright
(74) *Attorney, Agent, or Firm* — Fish & Richardson P.C.

(57) ABSTRACT

A refrigerator includes a cabinet having a storage space, a door that is configured to be drawn in and out of the storage space and includes a door portion defining a front surface and a drawer portion defining an accommodation space, and a wire guide module configured to connect a wire inside the cabinet to a wire inside the door. The wire guide module includes a plurality of connecting members which connect the cabinet to the door and accommodate the wire, and a connecting connection portion connected to one end of one connecting member of the plurality of connecting members and separably coupled to a door connector connected to the wire inside the door.

19 Claims, 14 Drawing Sheets

(56)  References Cited

U.S. PATENT DOCUMENTS

| | | | | |
|---|---|---|---|---|
| 5,112,241 A * | 5/1992 | Chesnut | H01R 13/5202 | 439/273 |
| 6,257,925 B1 * | 7/2001 | Jones | H01R 13/6273 | 439/357 |
| 2007/0093102 A1 * | 4/2007 | Park | H02G 3/088 | 439/164 |
| 2011/0005264 A1 * | 1/2011 | Lee | F25D 25/025 | 62/449 |
| 2011/0181163 A1 * | 7/2011 | Han | F25D 23/04 | 312/405 |
| 2019/0285334 A1 * | 9/2019 | Zhang | B21D 28/34 | |
| 2020/0173712 A1 * | 6/2020 | Choi | F25D 25/00 | |
| 2021/0010745 A1 * | 1/2021 | Choi | F25D 29/005 | |
| 2021/0018260 A1 | 1/2021 | Xu et al. | | |
| 2022/0128295 A1 * | 4/2022 | Wei | F25D 23/021 | |
| 2022/0325947 A1 * | 10/2022 | Jung | F25D 27/00 | |
| 2024/0328708 A1 * | 10/2024 | Modi | F25D 25/025 | |

FOREIGN PATENT DOCUMENTS

| | | | | | |
|---|---|---|---|---|---|
| JP | 11204191 A | * | 7/1999 | | |
| KR | 10-1715936 B1 | | 3/2017 | | |
| KR | 20210058222 A | * | 5/2021 | | F25D 25/024 |
| WO | WO 2019/165522 | | 9/2019 | | |
| WO | WO-2022088752 A1 | * | 5/2022 | | H01R 41/00 |

* cited by examiner

FIG. 9

REFRIGERATOR

CROSS-REFERENCE TO RELATED APPLICATIONS

The present application claims priority under 35 U.S.C. 119 and 35 U.S.C. 365 to Korean Patent Application No. 10-2022-0061499, filed on May 19, 2022, which is hereby incorporated by reference in its entirety.

BACKGROUND

The present disclosure relates to a refrigerator.

In general, a refrigerator is a home appliance provided to store various foods or beverages for a long time by using cool air generated by using circulation of a refrigerant according to a refrigerating cycle.

Such a refrigerator may be classified into a refrigerator having a rotational door, a refrigerator having a drawer type door, and a mixed opening/closing type refrigerator according to an opening/closing method of a door that opens and closes an internal storage compartment of a cabinet.

The drawer-type door may be drawn out while being slid from an inner space of the cabinet by user's manipulation. Such a drawer-type door may include a door portion defining a front surface and a drawer portion provided behind the door portion and accommodated in the inner space of the cabinet.

Recently, a product in which a drawer-type door is automatically drawn out, or a controller of each of various refrigerators is installed in the drawer-type door has been released. Thus, a structure in which power is supplied to the door portion of the drawer-type door, and various electrical wires are connected to a main PCB of a refrigerator body is applied.

Korean Patent Registration No. 10-1715936 discloses a refrigerator in which a manipulation portion is provided on a front surface of a drawer, and a cable extending from a refrigerator body toward the drawer is not exposed to the outside.

The draw-out structure of the cable installed in the refrigerator according to the related art is configured so that the cable is exposed to the side of a switching room through a sidewall of the switching room, and the cable moves in a front and rear direction along a cable guide hole when the drawer moves.

However, in the draw-out of the cable applied to the refrigerator according to the related art, the cable may not have a extending length, but be installed to be movable forward and backward along the guide hole. In this case, a hook phenomenon occurs while the cable moves along the guide hole so that the cable is easily broken, and an end of the cable is separated to be disconnected to the outside of the guide hole.

In addition, in a wire connection structure below the door of the refrigerator according to the related art requires connection of a wire and coupling of a coupling member before a drawer portion is assembled with a door portion. Thus, in the state in which the drawer portion is mounted on the door portion, the connection of the wire is impossible, and thus, the assembling operation is complicated.

SUMMARY

It is an object of the present disclosure to overcome the problems of the prior art. In particular, it is an object to provide a refrigerator capable of connecting a cable that supplies power to the refrigerator to which a drawer type door is applied.

It is a further object to provide a refrigerator capable of preventing a cable from being exposed to the outside and/or from being disconnected and/or from sagging while a drawer type door moves.

At least one of these objects are solved by the features of the independent claim.

In one embodiment, a refrigerator includes a wire guide module configured to guide a cabinet-side wire to a door, wherein a connecting member or a guide head, which constitutes the wire guide module, and a connection portion are separably coupled to each other.

According to one aspect, a refrigerator includes a cabinet defining a storage space; a drawer-type door configured to be drawn in and out of the storage space; and a wire guide module configured to guide a wired connection from the cabinet to the door, wherein the wire guide module includes a first connector (e.g. a guide head) and a second connector, which are separably coupled to each other.

According to one aspect, a refrigerator includes: a cabinet having or defining a storage space; a door disposed to be drawn in and out of the storage space and comprising a door portion configured to define a front surface and a drawer portion configured to define an accommodation space; a wire guide module configured to connect a wire inside the cabinet to a wire inside the door, wherein the wire guide module comprises: a plurality of connecting members which is disposed to connect the cabinet to the door and in which the wire is accommodated; and a connection portion connected to one end of one connecting member of the plurality of connecting members and separably coupled to a door connector connected to the wire inside the door.

According to a further aspect, a refrigerator includes: a cabinet defining a storage space; a door configured to be drawn in and out of the cabinet; and a wire guide module for guiding and/or supporting at least one wired connection (i.e. at least one wire connecting) between the cabinet and the door, wherein the wire guide module comprises: a plurality of connecting members accommodating the wired connection between the cabinet and the door; a first connector coupled to the door and accommodating a door connector connected (e.g. by a wire) to at least one electrical component of the door; and a second connector which is coupled via the connecting members to the cabinet and accommodates a main connector connected to at least one electrical component and/or to at least one power line in the cabinet, wherein the first and second connectors are configured to separably couple with each other to separably connect the main connector and the door connector, i.e. to separably connect a wire inside the cabinet to a wire inside the door. The door may comprise a door portion defining a front surface of the refrigerator, i.e. of the door, and a drawer portion defining an accommodation space therein.

The refrigerator according to any one of these aspects may include one or more of the following features:

In this disclosure, directional indications, such as up, down, below, top, bottom, etc., are to be understood with respect to gravity and an operational orientation of the refrigerator. Likewise, directional indications, such as front, rear, are to be understood with respect to an operational orientation of the refrigerator.

The door may be a drawer-type door. The door portion may define a front surface of the door and/or of the refrigerator. The door portion may extend in a vertical plane. The door may be configured to move linearly, i.e. to be drawn in and out of the cabinet. That is, the door may be configured to move or slide in front-rear direction. The door may include at least one electrical component, e.g. a lighting device and/or an input device. The wired connection between the cabinet and the door may be for signal and/or power transmission.

The connection portion may include a first connector accommodating a door connector and a second connector accommodating a main connector.

The main connector may be connected to at least one electrical component in the cabinet and/or to at least one power line, e.g. of the refrigerator or of an external power supply.

The door connector may be connected to at least one electrical component in the door, e.g. a lighting device and/or an input device.

The wire guide module may be configured to prevent sagging and/or dangling of a wired connection, i.e. of at least one wire. The plurality of connecting members may be configured as a cable chain. The connecting members may be connected to each other such as to provide a bending flexibility in a horizontal plane and/or to stabilize the wired connection in vertical direction.

The second connector may be coupled to one connecting member of the plurality of connecting members or to a drawer fixing portion.

A main connector connected to the wire or wired connection inside the connecting member may be accommodated in the connection portion, i.e. in the second connector. The main connector may be connectable and/or separably connected to the door connector.

The wire guide module may be provided below the drawer portion of the door. The wire guide module may be coupled to an inner surface of the cabinet, e.g. a bottom surface or a lower portion of a side or rear surface. The wire guide module may be coupled to the door portion, e.g. a rear surface of the door portion facing the storage space.

The wire guide module may comprise a guide head mounted or coupled to the door, e.g. to the door portion, in particular to a rear surface of the door portion. The wire guide module may comprise a mounting plate mounted or coupled to the cabinet, e.g. to an inner surface of the cabinet. The wire module may comprise a rotation connection member rotatably coupling the connecting members to the mounting plate. The wire or wired connection may pass through the mounting plate and the rotation connection member to be guided by the connecting members to the door.

The guide head may include the first connector. The guide head may include a head connection portion protruding therefrom as the first connector, the head connection portion being configured to be inserted into the second connector.

When the first connector and the second connector are coupled, the door connector and the main connector may be connected to each other to establish a wired connection between the door and the cabinet.

The wire guide module may include a guide head which is coupled to the door portion and through which the wire inside the door is accessible. The guide head may comprise a head connection portion which extends toward the connection portion, e.g. the second connector, and in which the door connector is mounted. Thus, the head connection portion may be or function as the first connector.

The second connector may be separably coupled to the head connection portion, i.e. the first connector.

A connection protrusion provided to protrude may be disposed on an outer surface of the head connection portion.

The second connector may be separably coupled to a coupling hole into which the connection protrusion of the head connection portion is inserted.

The connection portion, in particular the second connector, may be disposed between one end of the connecting member and the guide head.

The second connector may accommodate a main connector connected to a wire inside the connecting member. When the second connector is coupled to the guide head (e.g. to the head connection portion being the first connector), the door connector and the main connector may be connected to each other.

A hook portion may be disposed on a bottom surface of the drawer portion. The wire guide module further comprises a drawer fixing portion restricted to be hooked with the hook portion or configured to be engaged with the hook portion.

The drawer fixing portion may be connected to one of the plurality of connecting members. The drawer fixing portion may be connected between adjacent two of the plurality of connecting members. The drawer fixing portion may have a connection rib protruding from a surface thereof facing the drawer portion. The connection rib may extend in a horizontal direction perpendicular to a direction along which the door is movable.

The plurality of connecting members may include a linear section disposed to cross a lower side of the drawer portion in a front and rear direction. The drawer fixing portion and the hook portion may be disposed in the linear section.

The refrigerator may include a protrusion protruding downward from a bottom surface of the drawer portion.

The wire guide module may include a mounting plate mounted on a bottom surface of the storage space to define a mounting opening through which the wire of the cabinet is accessible. The wire guide module may include a rotation connection member configured to communicate with the mounting plate so that the cabinet-side wire is guided into the rotation connection member.

The door portion may include: a panel assembly configured to define an outer appearance of a front surface; and a door body coupled to a rear side of the panel assembly. A front surface of the panel assembly may be made of a material through which light is capable of being transmitted. The door portion may further comprise a lighting device provided at one side of the panel assembly.

The connection portion may be disposed between the connecting members. That is, the first connector and the second connector may be disposed between the connecting members. The first connector may be coupled to the door portion, in particular to the guide head, by at least one of the connecting members (93) and/or the second connector may be coupled to the cabinet, in particular to the rotation connection member, by at least one of the connecting members. The first connector in which the door connector is accommodated and the second connector in which the main connector is accommodated may be separably coupled to each other.

The wire guide module may include: a mounting plate mounted on a bottom surface of the storage space to define a mounting opening through which the wire of the cabinet is accessible. The wire guide module may include a rotation connection member configured to communicate with the mounting plate so that the cabinet-side wire is guided into the rotation connection member.

The connection portion, i.e. the first connector and the second connector, may be disposed closer to the door portion, in particular to the guide head, than to the rotation connection member. The connection portion, i.e. the first connector and the second connector, may be disposed closer to the guide head than the rotation connection member among the plurality of connecting members.

The first connector may include a first connector coupling portion extending in a direction of the second connector, and the second connector may comprise a second connector coupling portion configured so that the first connector coupling portion is restricted to be hooked.

When the first connector and the second connector are coupled to each other, the door connector and the main connector may be electrically connected to each other.

The details of one or more embodiments are set forth in the accompanying drawings and the description below. Other features will be apparent from the description and drawings, and from the claims.

BRIEF DESCRIPTION OF THE DRAWINGS

FIG. 9 is a view illustrating a state in which the wire guide module is mounted on the drawer door when viewed from below.

DETAILED DESCRIPTION OF THE EMBODIMENTS

Hereinafter, detailed embodiments will be described in detail with reference to the accompanying drawings. However, the present disclosure is limited to the embodiments in which the idea of the present invention is proposed, and other degenerate idea or other embodiments included in the scope of the present invention may be easily proposed by addition, changes, deletions, etc. of other elements.

Figure 1:
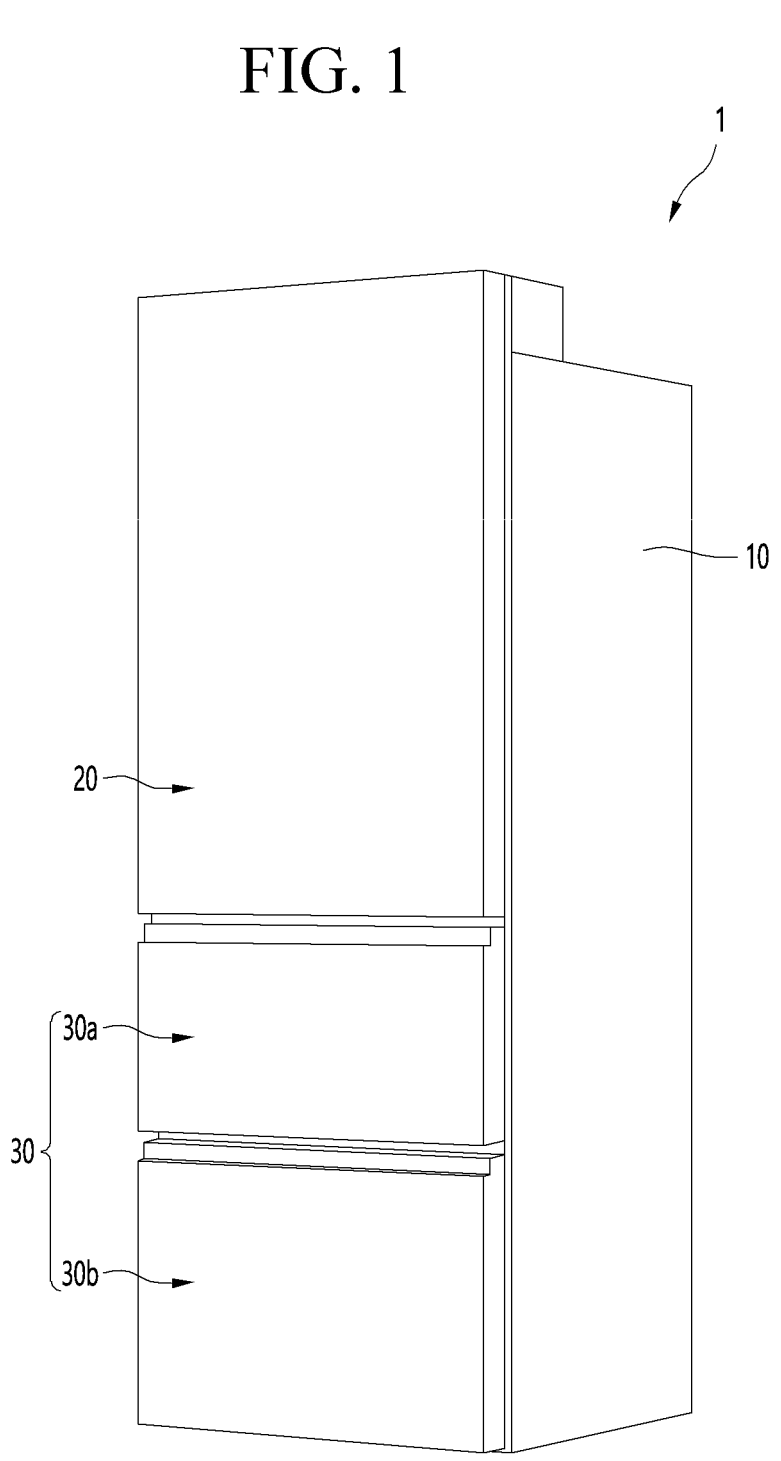
FIG. 1 is a perspective view of a refrigerator according to an embodiment.
Figure 2:
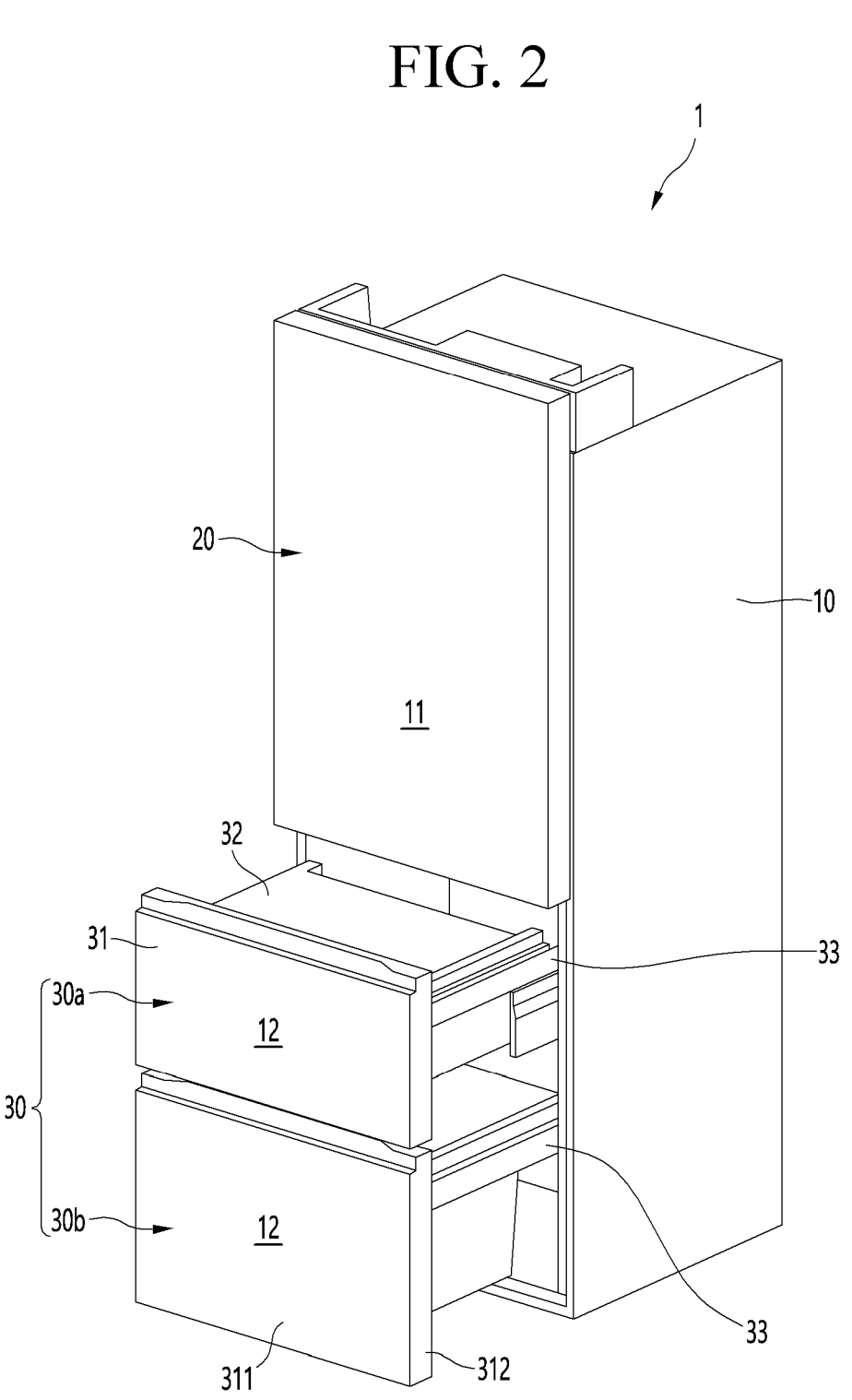
FIG. 2 is a view illustrating a state in which a drawer door of the refrigerator is drawn out.

FIG. 1 is a perspective view of a refrigerator according to an embodiment. Also, FIG. 2 is a view illustrating a state in which a drawer door of the refrigerator is drawn out.

Referring to FIG. 1, a refrigerator 1 may have an outer appearance defined by a cabinet 10 defining storage spaces and a door shielding an opened front surface of the cabinet 10.

The cabinet 10 may include an outer case 102 defining the outer appearance of the refrigerator 1 and an inner case 101 defining the storage spaces 11 and 12. An insulating material may be provided between the outer case 102 and the inner case 101 to insulate the storage spaces.

The storage spaces of the cabinet 10 may be partitioned into a plurality of spaces. For example, the cabinet 10 may be vertically partitioned by a barrier 13 disposed to be elongated in a horizontal direction. That is, the cabinet 10 may include an upper storage space 11 defined at a upper side and a lower storage space 12 defined at a lower portion.

The upper storage space 11 and the lower storage space 12 may be maintained at the same temperature or different temperatures while defining independent spaces, respectively, according to user's setting.

Alternatively, the upper storage space 11 may be used as a refrigerating compartment that stores food in a refrigerating state, and the lower storage space 12 may be used as a freezing compartment that store food in a freezing state.

The upper storage space 11 and the lower storage space 12 may be configured to be opened and closed by doors 20, respectively.

The doors 20 and 30 may include an upper door 20 that opens and closes the upper storage space 11. The upper door 20 may be connected by a hinge device and be rotatably mounted on the cabinet 10 to open and close the upper space. The upper door 20 may also be called a rotational door 20.

The doors 20 and 30 may include a lower door 30 that opens and closes the lower storage space 12. The lower storage space 12 may be partitioned into a plurality of spaces, or one space may be opened and closed by a plurality of doors. In this case, the door may be constituted by a plurality of lower doors 30.

The lower door 30 may be configured to open and close the lower storage space 12 by drawing in and out in a drawer type manner. In detail, the lower door 30 may be slidably drawn in and out forward and backward to open and close the storage space in the drawer type. The lower door 30 may also be called a drawer door 30.

The lower space 12 may be partitioned vertically, and the drawer door 30 may include a first drawer door 30*a* and a second drawer door 30*b*.

Although the refrigerator in which all of the rotational door 20 and the drawer door 30 are provided is described, the present disclosure is not limited thereto. For example, the present disclosure may be applied to all refrigerators including a door that is inserted and withdrawn in the drawer type. Also, the rotational door 20 may be provided at an upper portion and thus called an upper door, and the drawer door 30 may be provided at a lower portion and thus called a lower door.

In detail, the drawer door 30 may define the front surface of the door 30 and include a door portion 31 that opens and closes the storage space and a drawer portion 32 coupled to a rear surface of the door portion 31 so as to be drawn in and out together with the door portion 31.

The door portion 31 may be exposed to the outside of the cabinet 10 to define the outer appearance of the refrigerator 1. The drawer portion 32 may be disposed inside the cabinet to define the storage space.

The door portion 31 and the drawer portion 32 may be coupled to each other so as to be drawn in and out in a front and rear direction together with each other. In addition, a front surface of the door portion 31 may have a size greater than that of a front surface of the drawer portion 32. Therefore, in a state in which the drawer type door 30 is inserted into the cabinet 10, the drawer portion 32 may be covered by the door portion 31, and the door portion 31 may define the outer appearance of the front surface of the door 30.

For example, a rail frame 33 on which a draw in-out rail that guiding the drawn in-out of the door 30 is mounted may be mounted on a rear surface of the door portion 31. The draw in-out rail may have one end fixed to the storage space inside the cabinet 10 and the other end fixed to the rail frame 33 so that the door 30 is drawn in and out stably.

In addition, a draw in-out rack 34 may be provided on one surface of the storage space. The draw in-out rack 34 may be provided at both sides. The draw in-out rack 34 may allow the draw in-out rail to move in the front and rear direction, and thus, the door 30 may be drawn in and out of the storage space.

A control panel provided with a manipulation button through which the user manipulates functions of the refrigerator 1 from the outside and a display that displays an operation state may be provided on the door portion 31.

The door portion 31 may be provided with a lighting device provided so that the front surface of the door shines brightly in a color set by the user.

In detail, although not limited thereto, the door portion 31 may include a panel assembly 311 defining the outer appearance of the front surface of the door and a door body 312 defining the overall shape of the door 30 and opening and closing the storage space. In addition, a door liner 313 defining a rear surface of the door body 312 may be provided.

In this case, a front surface of the panel assembly 311 may be made of a transparent material capable of transmitting light. For example, the panel assembly 311 may be made of a material capable of transmitting light, such as glass, ABS, PMMA, and PC.

Also, the lighting device may be provided at one side of the panel assembly 311. The lighting device may include a light source constituted by RGB LEDs capable of emitting light having various colors. The light emitted from the light source may be guided to the front surface of the door by the light guide plate provided inside the panel assembly 311. Due to this structure, the entire front surface of the door portion 31 may brightly shine in the color set by the user. Therefore, there is an advantage in that the color of the front surface of the door is changed according to user's taste even if the door is not replaced.

The panel assembly 311 provided with the lighting device may not be limited to the drawer type door 30 and may also be applied to the rotational door 20. Thus, the entire front surfaces of the upper door 20 and the lower door 30 may brightly shine in the set color by the panel assembly 311.

The drawer portion 32 may be disposed on the rear surface of the door portion 31 to define a space in which food or containers to be stored are accommodated. The inside of the drawer portion 32 may have an accommodation space that is opened upward.

The control panel or lighting device may be electrically connected to electric components provided inside the cabinet 10 by the wire guide module 90. The wire guide module 90 may be fixed and mounted inside the cabinet 10 and be connected to the door portion 31.

Hereinafter, the wire guide module 90 according to an embodiment will be described in detail.

Figure 3:
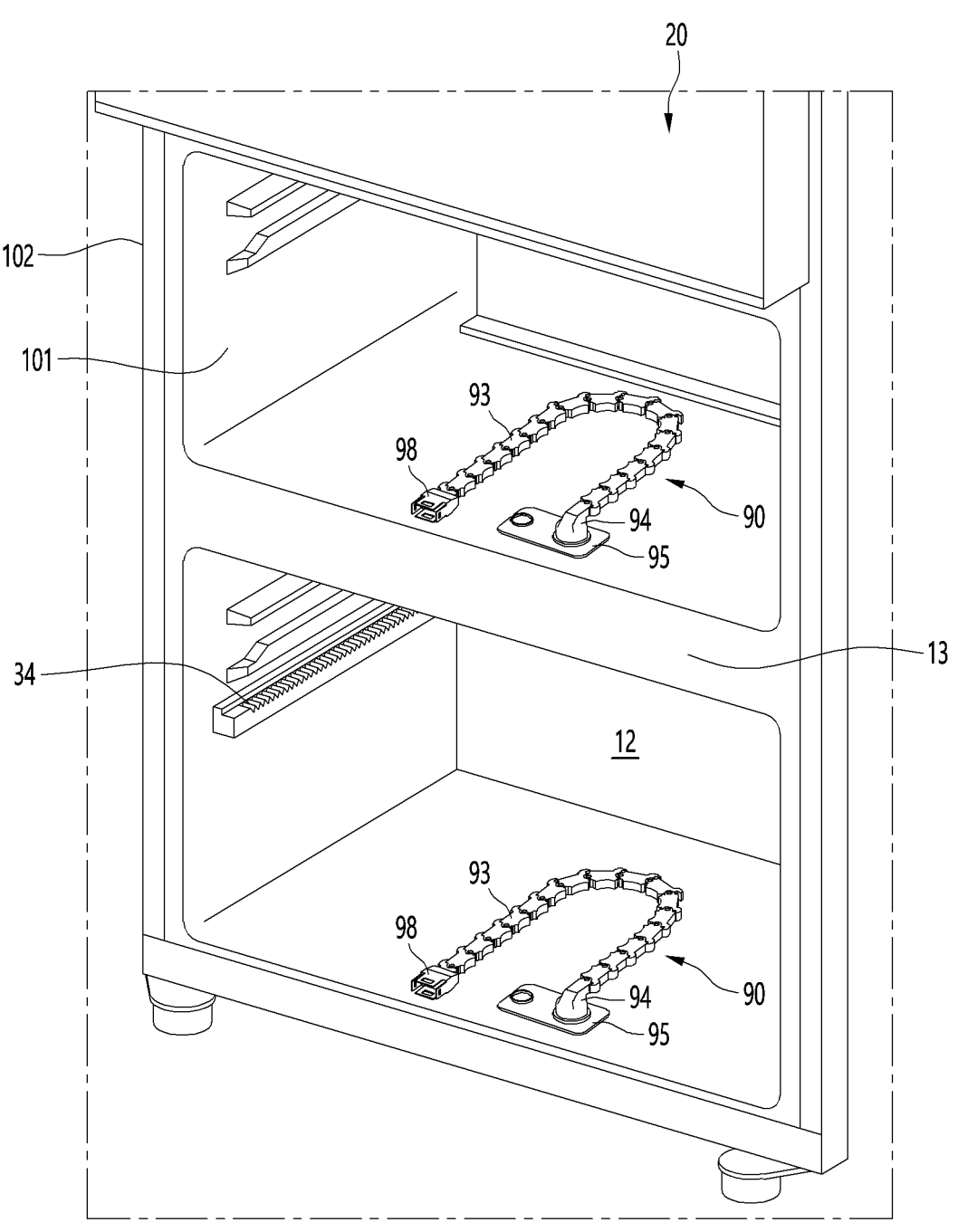
FIG. 3 is a view illustrating a state in which a wire guide module is mounted on the cabinet of the refrigerator.
Figure 4:
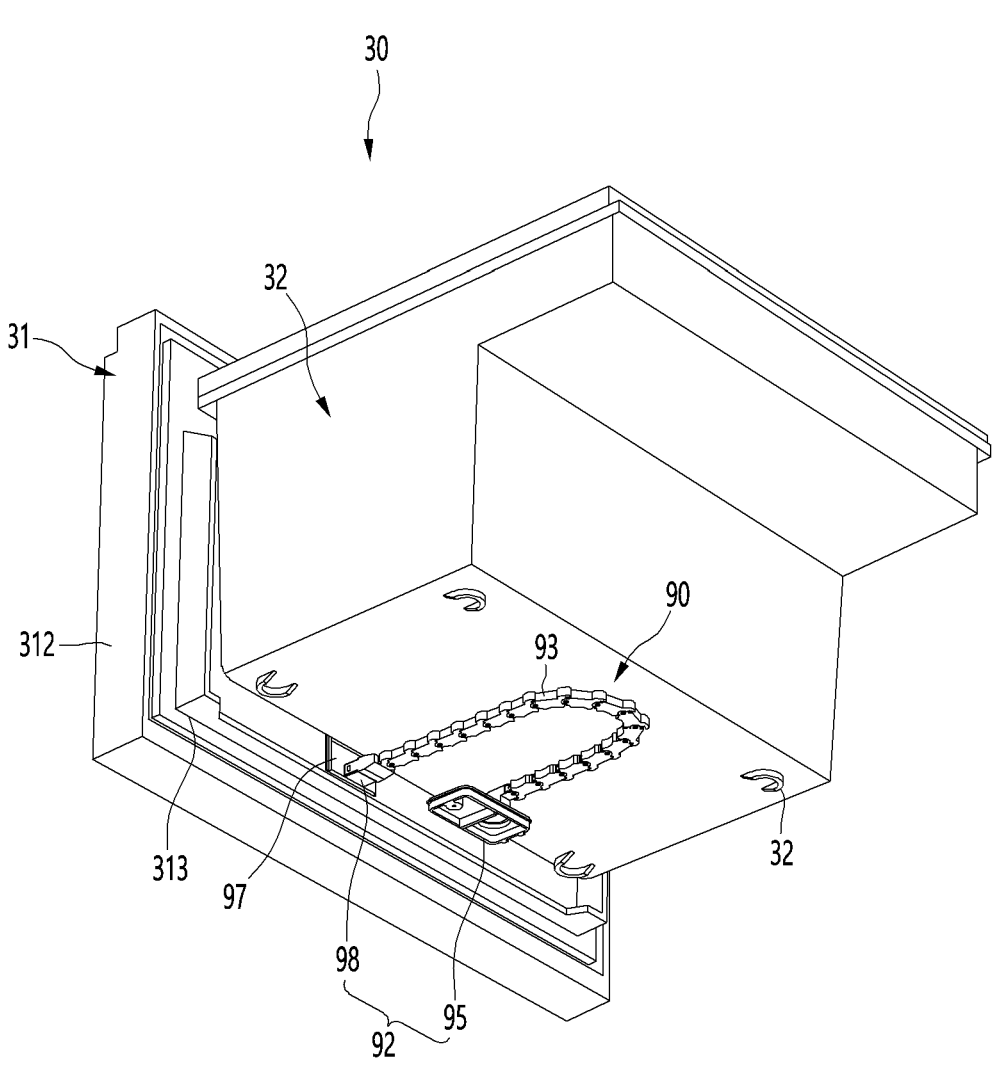
FIG. 4 is a view of the drawer door when viewed from below.
Figure 5:
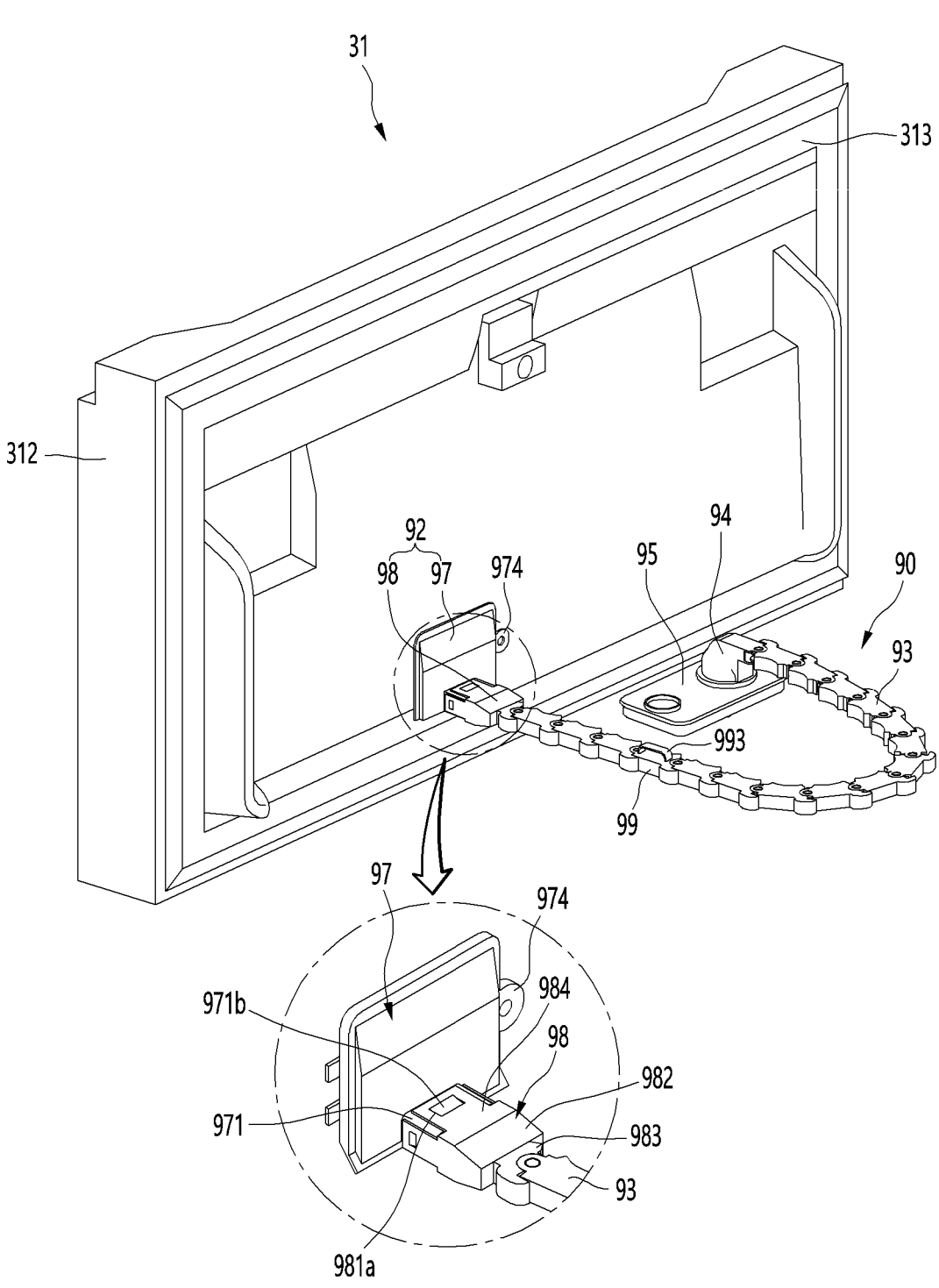
FIG. 5 is a view illustrating a state in which the wire guide module is mounted on a door portion.

FIG. 3 is a view illustrating a state in which the wire guide module is mounted on the cabinet of the refrigerator. Also, FIG. 4 is a view of the drawer door when viewed from below. Also, FIG. 5 is a view illustrating a state in which the wire guide module is mounted on the door portion.

The wire guide module 90 may be provided inside the lower storage space 12. In detail, the wire guide module 90 may be disposed in front of a bottom surface of the lower storage space 12.

The wire guide module 90 may be connected to the door 30 and may be drawn in and out together with the door 30. A wire 962 may be disposed inside the wire guide module 90. The wire 962 may be guided up to the door portion 31 along the wire guide module 90.

Thus, even when the door 30 is drawn out forward, electric components provided inside the door 30 may be electrically connected to components provided inside the cabinet 10.

The wire guide module 90 includes a connection portion 92, a plurality of connecting members 93, a rotation connection member 94, and a mounting plate 95.

The mounting plate 95 may be mounted on a bottom surface of the storage space 12. For example, the mounting plate 95 may be disposed at a position biased forward from a center of the bottom surface of the storage space 12. The mounting plate 95 may be provided to fix one end of the wire guide module 90 to the storage space 12. In addition, the mounting plate 95 has a structure that communicates with the cabinet 10 so that the wire 962 disposed inside the wire guide module 90 is electrically connected to components provided inside the cabinet 10. In this case, the connection portion 92 may be disposed at a center of the rear surface of the door portion 31.

A plurality of connecting members 93 are disposed between the connection portion 92 and the mounting plate 95. Also, the mounting plate 95 may be connected to the connecting member 93 by the rotation connection member 94.

In other words, the mounting plate 95 may have a structure in which the connection portion 92 and the rotation connection member 94 are disposed to be spaced apart from each other, and the connection portion 92 and the rotation connection member 94 are connected to each other by the connecting members 93.

A lower end of the door portion 31 may be disposed lower than the bottom of the drawer portion 32. In addition, the wire guide module 90 may have a structure that the connection portion 92 is connected to the rear surface of the door portion 31 via a lower side of the drawer portion 32 in a state in which one end of the wire guide module 90 is fixed to the mounting plate 95. Here, a portion of the wire guide module 90 may be connected to the connection portion 92 to pass through a central portion of the drawer portion 32 in a state of being fixed to the lower side of the drawer portion 32.

Hereinafter, each of the components constituting the wire guide module 90 will be described in more detail with reference to the drawings.

Figure 6:
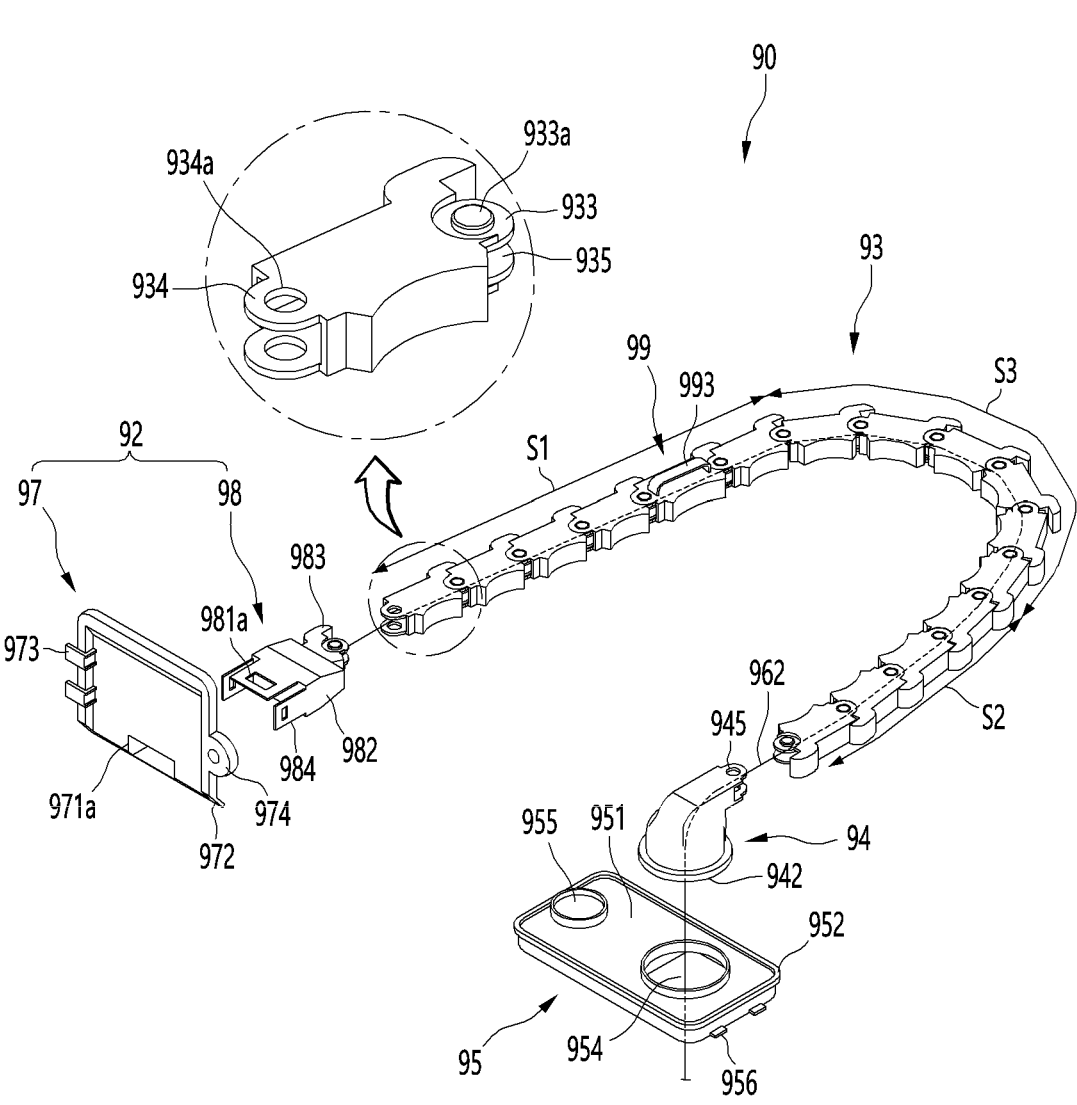
FIG. 6 is an exploded perspective view of the wire guide module when viewed from above.
Figure 7:
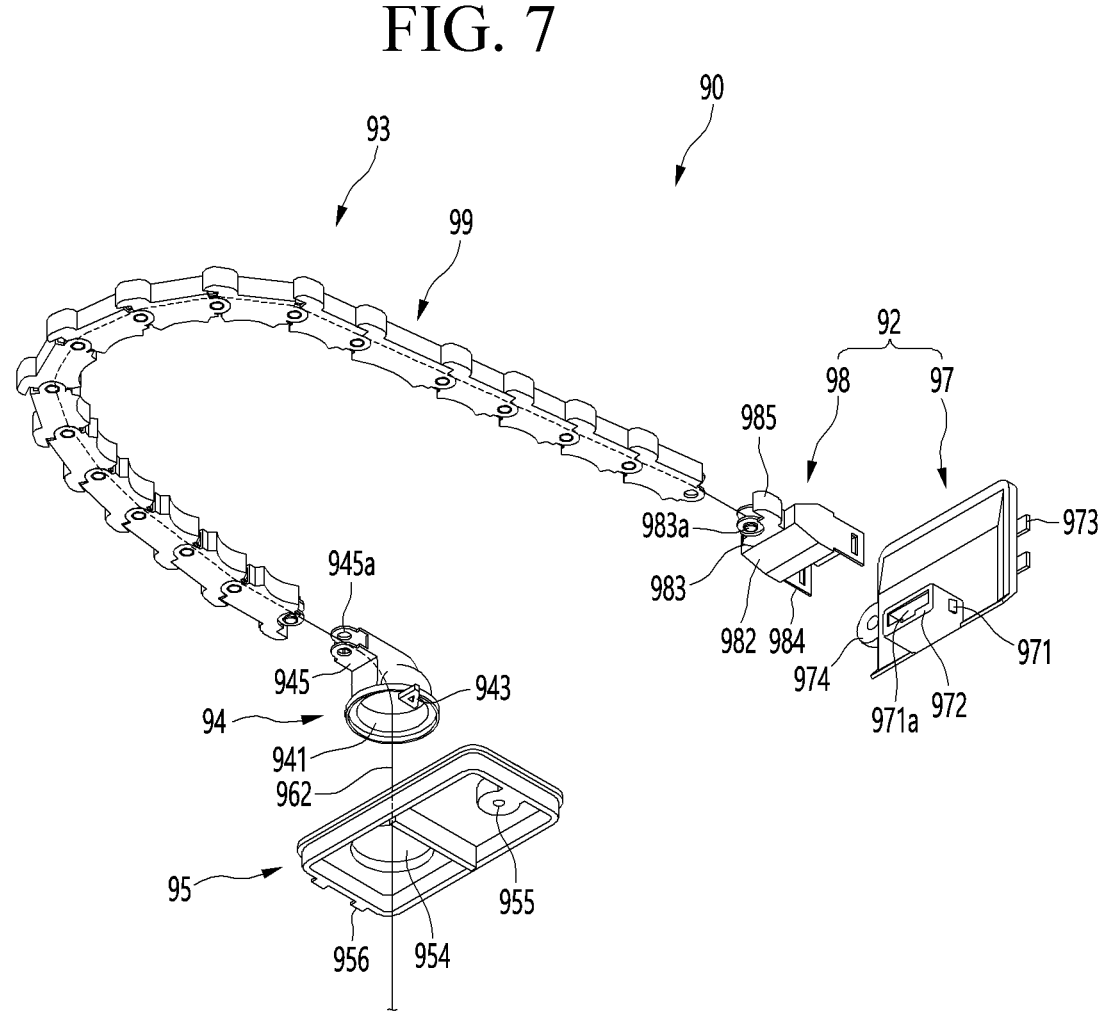
FIG. 7 is an exploded perspective view of the wire guide module when viewed from below.

FIG. 6 is an exploded perspective view of the wire guide module when viewed from above. Also, FIG. 7 is an exploded perspective view of the wire guide module when viewed from below.

The wire guide module 90 according to an embodiment may include a connection portion 92 fixed to the rear surface of the door portion 31 and a plurality of connecting members 93 connecting the connection portion 92 to the cabinet 10. The wire guide module 90 according to an embodiment may further include a mounting plate 95 fixed to the bottom surface of the storage space 12, a rotation connection member 94 coupled to the mounting plate 95, one of the connecting members 93 being connected to the rotation connection member 94.

The mounting plate 95 may be provided in a plate shape as a whole and mounted on the bottom surface of the storage space 11.

The mounting plate 95 may include a recessed portion 951 having a top surface depressed downward and a circumferential portion 952 extending outward along a circumference of the recessed portion 951.

The mounting plate 95 may have a mounting opening 954 in which the rotation connection member 94 is mounted. The mounting opening 954 may be provided in a circular shape corresponding to a diameter of the rotation connection member 94.

A wire 962 that supplies power to the door 20 may be accessible through the mounting opening 954. The wire 962 introduced into the mounting opening 954 may be guided to the inside of the rotation connection member 94.

The mounting opening 954 may be defined at a position biased from the front side to one side in a region of the recessed portion 951.

The mounting plate 95 may have a mounting coupling hole 955 to which the coupling member is coupled. The coupling member may pass through the mounting coupling hole 955 and be coupled to the bottom surface of the storage space 12. Here, the bottom surface of the storage space 12 may be the bottom surface of the cabinet 10 or may be a top surface of the barrier 13 defining the bottom surface of the storage space 12.

A mounting coupling portion 956 may be additionally disposed on one end of a bottom surface of the mounting plate 95. The mounting coupling portion 956 may be restricted to be hooked with the bottom surface of the cabinet 10 so that the mounting plate 95 is more firmly fixed to the bottom surface of the storage space 12.

The rotation connection member 94 may be mounted on the mounting plate 95. The rotation connection member 94 may have a hollow therein so that the wire 962 passes through the inside of the rotation connection member 94 and is guided toward the connecting member 93.

The bottom surface of the rotation connection member 94 is opened to define a bottom surface opening 941 which communicates with the mounting opening 954 and through which the wire 962 is drawn in and out.

A stepped portion 942 of the connection member may be disposed around the bottom surface opening 941. The connection member stepped portion 942 may be accommodated inside the mounting plate 95.

The rotation connection member 94 has a structure that is freely rotatable without being separated from the state of being mounted on the mounting plate 95.

A connection member restriction portion 943 extending outwardly may be disposed on a bottom surface of the rotation connection member 94. The connection member restriction portion 943 may protrude downward from a bottom surface of the connection member stepped portion 942 and also extend in one direction.

The connection member restriction portion 943 may be extended to be restricted on the bottom surface of the mounting plate 95.

An opening 944 through which the wire 962 passes may be defined in one surface of the rotation connection member 94.

The opening 944 may allow the wire 962 passing through the inside of the bottom surface of the rotation connection member 94 to be guided to the inside of the connecting member 93.

In addition, a connection member connecting portion 945 coupled to the connecting member 93 may be disposed on one surface of the rotation connection member 94.

The connection member connecting portion 945 may be provided in a pair, which are spaced apart from each other in a vertical direction with respect to the opening 944. In addition, a connection hole 945a defined to be axially coupled to one end of the connecting member 93 may be defined in the connection member connecting portion 945. Therefore, the connecting member 93 may be axially coupled to a rear protrusion 933a disposed on one end thereof, and the connecting member 93 may rotate around the connection hole 945a.

The plurality of connecting members 93 may be continuously connected to each other. Also, each of the connecting members 93 may be connected from the rotation connection member 94 to the connection portion 92. The plurality of connecting members 93 connected to each other may have the same shape and be continuously connected to be rotatable. The structure in which the connecting members 93 are coupled to each other may have a structure such as a chain. The wire 962 may sequentially pass through the insides of the connecting members 93 so as to be guided from the rotation connection member 94 to the connection portion 92.

The connecting member 93 may be provided in a box shape with a hollow inside in the front and rear direction. Also, the connecting member 93 may be disposed to allow the front and rear surfaces thereof to be opened so that the wire 962 passes therethrough. The plurality of connecting members 93 may form a chain-like structure, e.g. a cable or wire chain.

A front connection portion 934 extending forward may be disposed on each of upper and lower ends of one end of the connecting member 93. The front connection portion 934 may have a rounded end, and the opened connection hole 934a may be defined in a center thereof.

In addition, the rear connection portion 933 may be disposed to extend outward from each of upper end lower ends of the other end of the connecting member 93. Also, the rear protrusion 933a that protrudes may be disposed on each of top and bottom surfaces of the pair of rear connection portions 933. The rear protrusion 933a may be inserted into the connection member 934a of the connecting member 93 that is adjacent thereto.

In addition, a rear extension portion 935 may be further disposed between the rear connection portions 933, i.e., at one end of the opened rear surface of the connecting member 93. The rear extension portion 935 may further protrude from the other facing side surface. Thus, the rear extension portion 935 may restrict the rotation of the connecting member 93 in one direction so that the connecting member 93 rotates with directivity.

Due to this structure, the plurality of connecting members 93 may have a structure in which the connecting members 93 are continuously connected to each other. Also, the plurality of connecting members 93 may be connected to each other in a "U" shape as a whole. The connecting member 93 may be continuously connected to the rear to extend and then be continuously connected to face the front side again. The connecting member 93 may extend by including linear sections S1 and S2 connected in a straight line in the front and rear direction and a bending section S3 connecting the linear sections S1 and S2, which are disposed at both sides, to each other.

In addition, the rotation connection member 94 and the connection portion 92 may be respectively connected to the extending ends of the connecting member 93.

Here, a length of the linear section S1 connected to the connection portion 92 may be maintained even when the drawer door 30 is drawn in and out. On the other hand, the linear section S2 connected to the rotation connection member 94 and the bent section S3 may vary in length when the drawer door 30 is inserted and withdrawn.

The connection portion 92 includes a guide head 97 mounted on the door portion 31 and a second connector 98 connected to the connecting member 93 and detachably provided on the guide head 97. The guide head 97 may include a first connector.

The guide head 97 may be detachably connected to the second connector 98 in a state of being mounted on the door portion 31.

The guide head 97 may be provided in a rectangular frame shape with a front surface opened. The guide head 97 includes a head connection portion 971 as the first connector, the head connection portion 971 being connected to the second connector 98.

The head connection portion 971 may protrude and extend backward from a rear surface of the guide head 97. In addition, the head connection portion 971 has an opening 971a so that a door connector 82 is mounted therein. The door connector 82 may be connected to electric components inside the door, e.g. to a power line connected to the electric components inside the door. In addition, when the second connector 98 is coupled to the guide head 97, the second connector 98 may be connected to the wire 962 provided inside the connecting member 93. The second connector 98 may also be called a connector in that the second connector 98 connects the door connector 82 to a main connector 81. The main connector 81 may be connected to electric components inside the cabinet and/or to a power line of the refrigerator.

The head connection portion 971 may have an inclined surface coupled to the second connector 98. In detail, a rear surface of the head connection portion 971 may include an inclined portion 972 that is inclined to protrude further backward toward an upper side. The second connector 98 may be easily mounted at a proper position by the inclined portion 972.

A connection protrusion 971b coupled to the second connector 98 may be disposed on each of upper and lower ends and both ends of the heat connection portion 971. The connection protrusion 971b may be detachably coupled to a coupling hole 981a defined in the second connector 98.

The guide head 97 may further include a door coupling portion 973 coupled to the door portion 31 at one end thereof. The door coupling portion 973 may be inserted into the door portion 31 and then restricted to be hooked with the door portion 31.

The guide head 97 may have a through-hole 974, through which the coupling member coupled to the door portion 31 passes, in the other end thereof. The guide head 97 may be mounted on the rear surface of the door portion 31 by the door coupling portion 973 and the through-hole 974.

The second connector 98 may be detachably coupled to the guide head 97 in a state of being connected to one end of the connecting member 93.

The second connector 98 may include a main body 982, a connecting fixing portion 983 protruding from the main body 982 in a direction toward the connecting member 93, and a head fixing portion 984 extending from the main body 982 in a direction toward the guide head 97.

In detail, the second connector 98 may include a connecting fixing portion 983 coupled to the connecting member 93 at a position facing the connecting member 93.

The connecting fixing portion 983 may have a fixing protrusion 983a inserted into a connection hole 934a defined in the connecting member 93. The fixing protrusion 983a may be disposed at a position corresponding to the connection hole 934a of the connecting member 93. That is, the fixing protrusion 983a may be provided at each of upper and lower ends of the connecting fixing portion 983 and be provided in a pair.

A fixing connection portion 985 connecting the pair of connecting fixing portions 983 to each other may be provided. The fixing connection portion 985 may be connected to the connecting fixing portion 983 and may be provided in a structure surrounding one side of the connecting member 93. Thus, the second connector 98 may be prevented from excessively rotating.

In addition, the second connector 98 may have an opening defined between the pair of fixing protrusions 983a, and thus, the wire inside the connecting member 93 may be guided.

The main body 982 may be provided to allow portions of front and rear surfaces thereof to be opened so that the wires inside the connecting member 93 passes therethrough.

Also, the second connector 98 includes a head fixing portion 984 detachably coupled to the head connection portion 971 at a position facing the head connection portion 971.

The head fixing portion 984 may extend from an end of the main body in a direction in which the head connection portion 971 is disposed so as to be coupled to the head connection portion 971. The head fixing portion 984 may protrude from each of top, bottom, and both ends of the main body 982.

In addition, the head fixing portion 984 may be provided with a coupling hole 984a into which the connection protrusion 971b disposed on the head connection portion 971 is inserted. The connection protrusion 971b may be inserted into the coupling hole 984a so that the second connector 98 is coupled to the guide head 97.

In addition, the head fixing portion 984 is made of an elastic material and has a structure in which the connection protrusion 971b is detached from the coupling hole 984a.

A main connector 81 connected to the door connector 82 may be accommodated inside the head fixing portion 984. The main connector 81 has a structure connected to the wire inside the connecting member 93.

The wire inside the connecting member 93 may be guided inside the second connector 98 and extend to the opening 971a of the head connection portion 971.

The main connector 81 disposed to be connected to the door connector 82 may be provided on an end of the wire passing through the inside of the connecting member 93.

The door connector 82 and the main connector 81 may have detachable structures. The door connector 82 and the main connector 81 may have structures that are conflicted with each other.

As the door connector 82 and the main connector 81 are connected to each other, the electric components provided inside the cabinet 10 and the electric components provided inside the doors 20 and 30 may be electrically connected to each other.

Due to this structure, the guide head 97 and the second connector 98 may be connected to or separated from each other in the state in which the door portion 31 and the drawer portion 32 are coupled to each other. In detail, in a state in which one end of the wire guide module 90 is connected to the bottom surface of the storage space 12 by the mounting plate 95, the other end of the wire guide module 90 may be detachably connected to the door portion 31.

Figure 8:
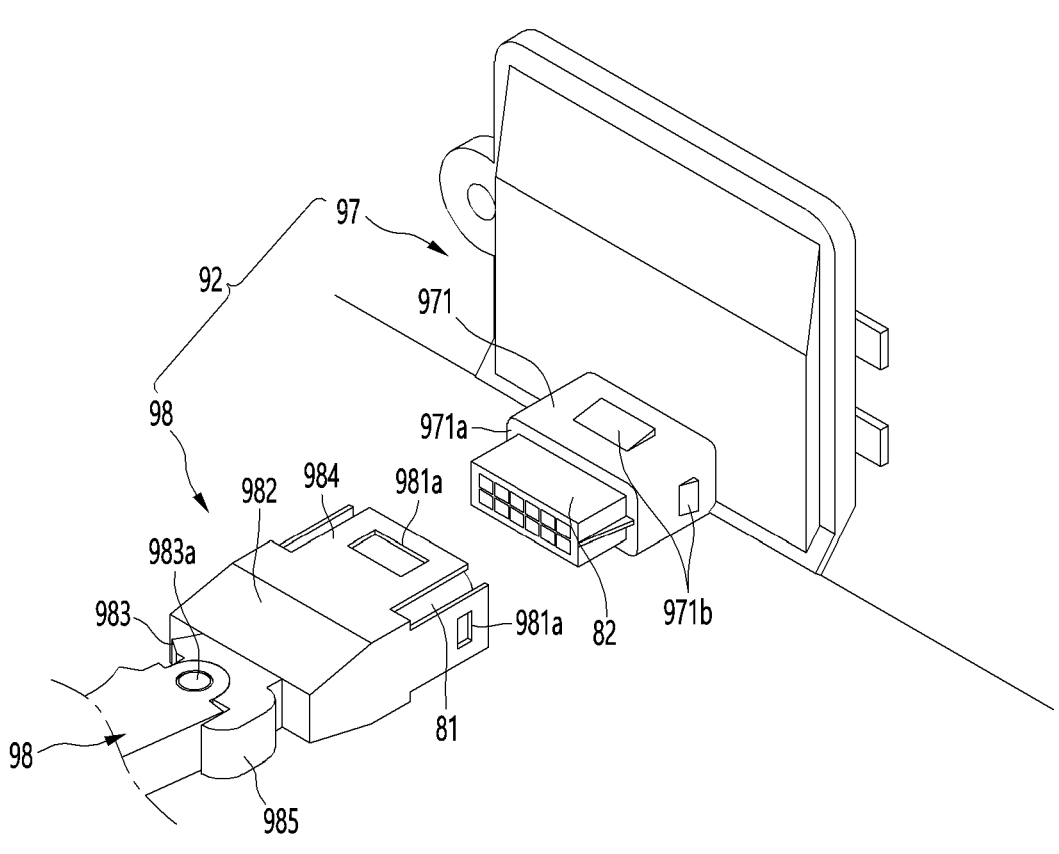
FIG. 8 is a view for explaining a process in which the wire guide module is coupled to the door portion.

FIG. 8 is a view for explaining a process in which the wire guide module is coupled to the door portion.

In the wire guide module according to an embodiment, the guide head 97 and the second connector 98 may be separated from each other as necessary.

In detail, when the door portion 31 is replaced, or a service situation occurs, the wire guide module 90 may separate the second connector 98 from the guide head 97 in the state of being connected to the cabinet 10.

In addition, in the state in which the mounting plate 95 is coupled to the bottom surface of the storage space 12, the operator may put his/her hand under the drawer portion 32 to connect the second connector 98 to the guide head 97.

Thus, the wire guide module 90 may be connected to the cabinet 10 and the door portion 31 without separating the door portion 31 from the drawer portion 32, thereby improving assemblability and workability.

Figure 9:
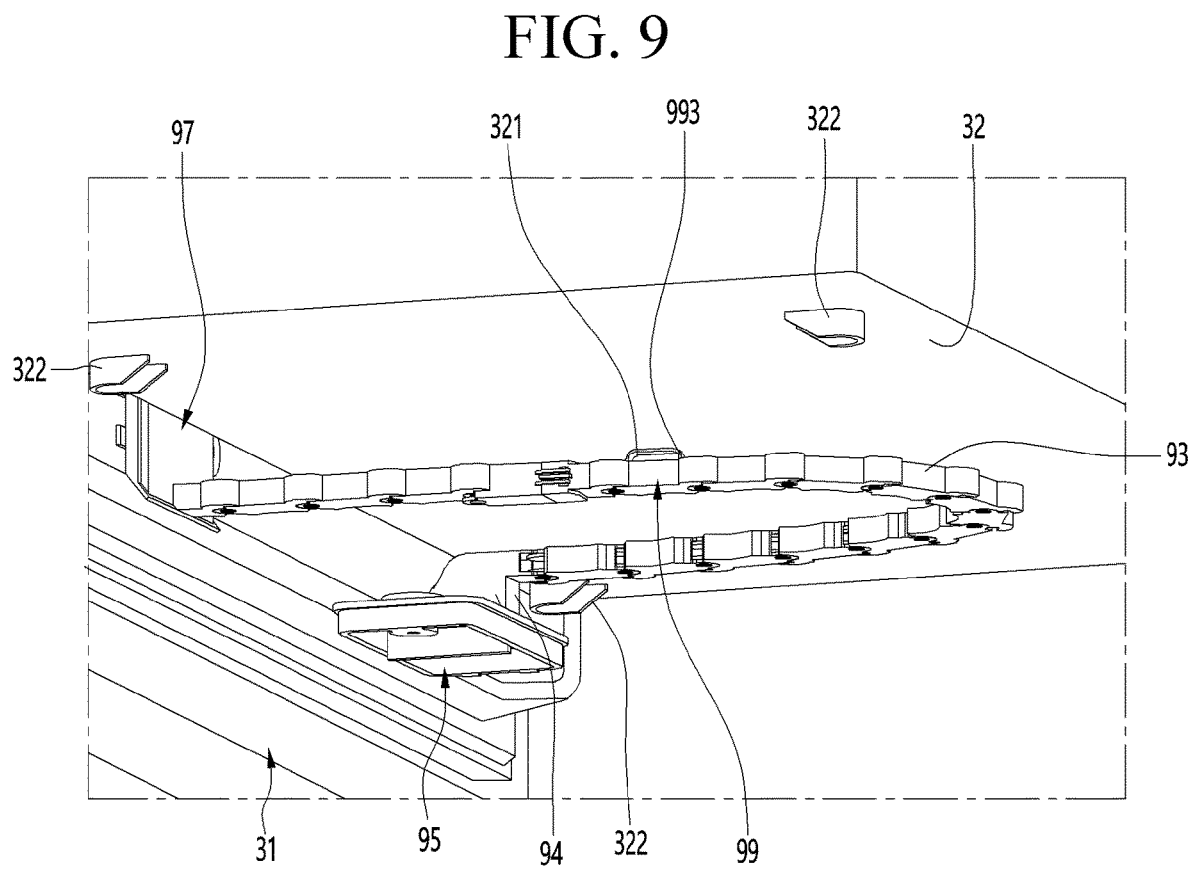
Figure 10:
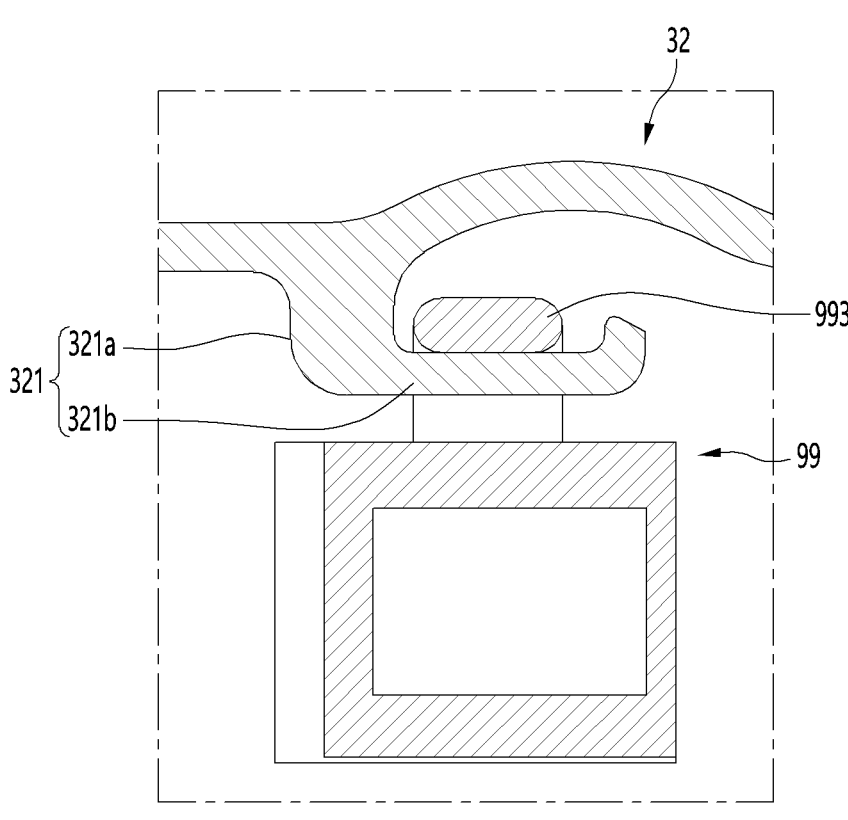
FIG. 10 is a cross-sectional view for explaining a state in which the wire guide module is mounted on the drawer door.

FIG. 9 is a view illustrating a state in which the wire guide module is mounted on the drawer door when viewed from below. Also, FIG. 10 is a cross-sectional view for explaining a state in which the wire guide module is mounted on the drawer door.

The wire guide module 90 according to an embodiment may further include a drawer fixing portion 99 between the connecting members 93. The drawer fixing portion 99 may be coupled to the bottom surface of the drawer portion 32 to prevent the wire guide module 90 from excessively moving.

The drawer fixing portion 99 may be provided between one connecting member 93 among the plurality of connecting members 93 and another connecting member 93 adjacent to the one connecting member 93. Also, both ends of the drawer fixing portion 99 may be connected to the connecting member 93.

The position at which the drawer fixing portion 99 is provided may not be limited, but may be provided at a position corresponding to a position passing through a central portion of the bottom surface of the drawer portion 32. In detail, the drawer fixing portion 99 may be provided on the linear section S1 connected to the door connection portion 92. More specifically, the drawer fixing portion 99 may be provided at a rear side on the linear section S1 connected to the door connection portion 92. That is, the drawer fixing portion 99 may be disposed to be spaced a set distance from the door connection portion 92 in terms of smooth movement of the wire guide module 90.

In addition, each of the plurality of connecting members 93 disposed behind the drawer fixing portion 99 and connected to the rotation connection member 94 may have a length that is enough to allow the door 30 to be drawn in and out.

Both the ends of the drawer fixing portion 99 may be provided to be the same as both ends of the connecting member 93. In detail, a front fixing portion 991 extending forward may be disposed on each of upper and lower ends of one end of the drawer fixing portion 99. The front fixing portion 991 may have a rounded end, and an opened connection hole 991a may be defined in a center of the front fixing portion 991. The rear protrusion 933a of the connecting member 93 may be inserted into the connection hole 991a.

The rear fixing portion 992 may extend outward from each of upper and lower ends of the other end of the drawer fixing portion 99. Also, the rear protrusion 992a that protrudes may be disposed on each of top and bottom surfaces of the pair of rear connection portions 992. The rear protrusion 992a may be inserted into the connection member 934a of the connecting member 93 that is adjacent thereto.

A connection rib 993 provided to be restricted and hooked with the drawer portion 32 may be disposed on an upper end of the drawer fixing portion 99. The connection rib 993 may extend from one end to the other end of the drawer fixing portion 99. In addition, the connection rib 993 may be spaced upward from the top surface of the drawer fixing portion 99 to define a space through which the hook portion 321 disposed on the drawer portion 32 passes.

The hook portion 321 may be disposed on the bottom surface of the drawer portion 32. The hook portion 321 may be disposed at a position at which the wire guide module 90 passes on the bottom surface of the drawer portion 32. The hook portion 321 may be restricted to be hooked with the connection rib 993. In detail, the hook portion 321 includes a first hook portion 321a extending downward from the bottom surface of the drawer portion 32 and a second hook portion 321b extending forward or backward from a lower end of the first hook portion 321a. The second hook portion 321b may pass through a space between the top surface of the drawer fixing portion 99 and the lower side of the connection rib 993. That is, the second hook portion 321b may be restricted to be hooked with the connection rib 993. Due to this structure, the drawer fixing portion 99 may be fixed to the bottom surface of the drawer portion 32.

In addition, a protrusion 322 protruding downward may be provided on the bottom surface of the drawer portion 32. The protrusion 322 may prevent the wire guide module 90 from being in contact with the bottom while the drawer fixing portion 99 is coupled to the hook portion 321 to move.

The protrusion 322 may be provided in plurality on corners of the bottom surface of the drawer 32. A length of the protrusion 322 in the vertical direction may not interfere with the draw in and out of the drawer 32. In addition, the protrusion 322 may prevent components of the wire guide module 90 from being damaged due to contact with the bottom while the wire guide module 90 passes through the bottom surface of the drawer portion 32.

The connecting member 93 of the wire guide module 90 may move according to the draw in and out of the door 30.

Here, since the drawer fixing portion 99 is fixed to the bottom surface of the drawer portion 32, the rotation or movement of the connecting members 93 disposed in front of the drawer fixing portion 99 may be restricted. Thus, the second connector 98 may be prevented from being separated or damaged by the movement of the connecting members 93 disposed in the front of the drawer fixing portion 99.

In addition, as the door 30 is drawn in and out, the connecting members 93 disposed behind the drawer fixing portion 99 may rotate or be bent to move. Here, when the connecting members 93 rotate out of a predetermined angle during the forward and backward movement of the connecting members 94, the connecting members 93 may be prevented from being excessively bent.

The length of the drawer fixing portion 99 in the front and rear direction may correspond to or may be greater than that of the single connecting member 93.

The wire guide module according to an embodiment has a structure in which the guide head 97 and the second connector 98 are separable. In addition, the door connector 82 accommodated in the opening of the guide head 97 and the main connector 81 accommodated in the second connector 98 may be connected to each other. Due to this structure, the electrical components inside the door 30 and the electrical components inside the cabinet may be detachably connected to each other. In addition, since the drawer fixing portion 99 of the wire guide module 90 is fixed to the bottom surface of the drawer portion 32, the guide head 97 may be prevented from being separated from the guide head 97 or damaged according to the draw in and out of the door 30.

Hereinafter, a wire guide module according to another embodiment will be described in detail.

Figure 11:
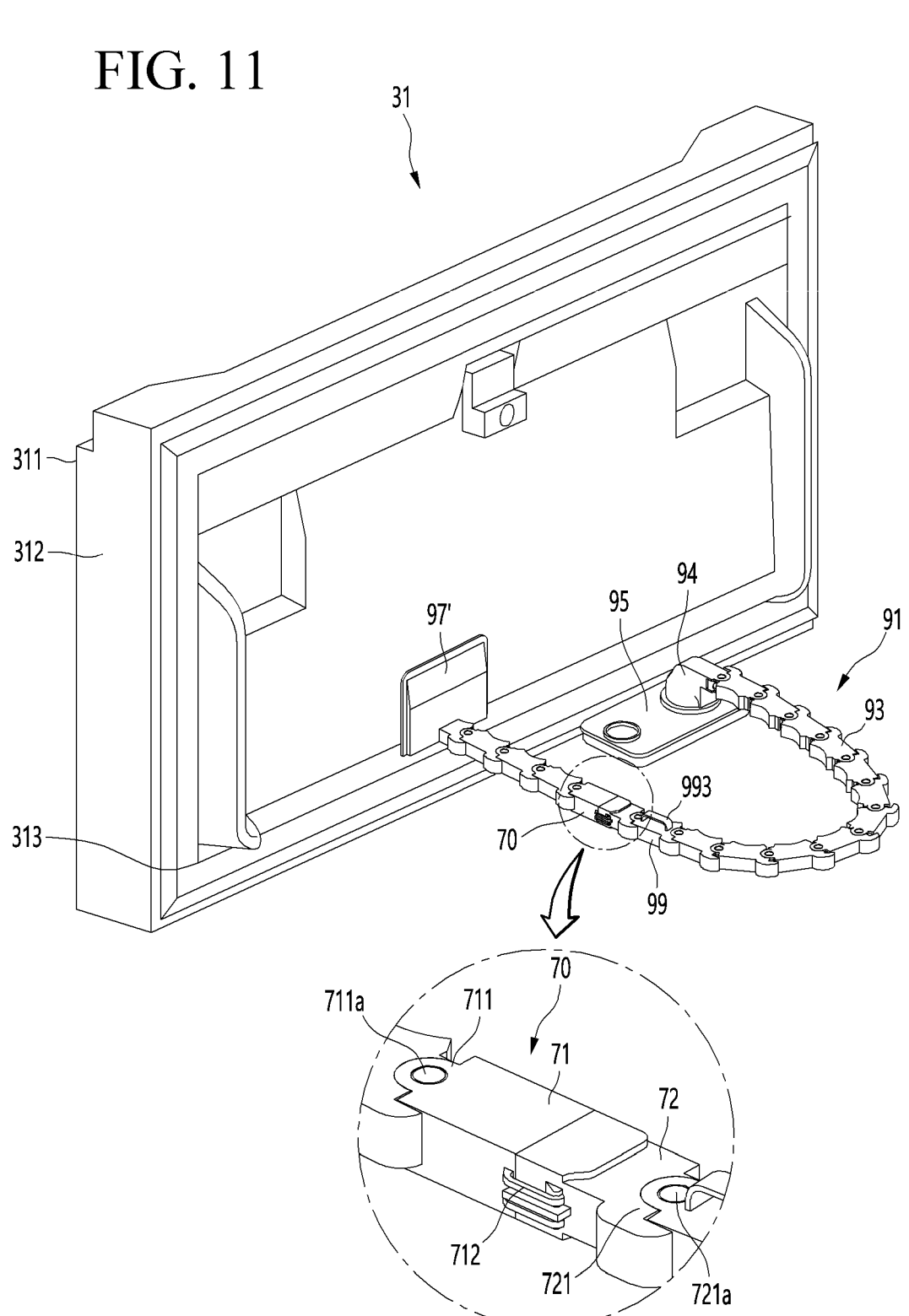
FIG. 11 is a view illustrating a state in which a wire guide module is mounted on a door portion according to another embodiment.
Figure 12:
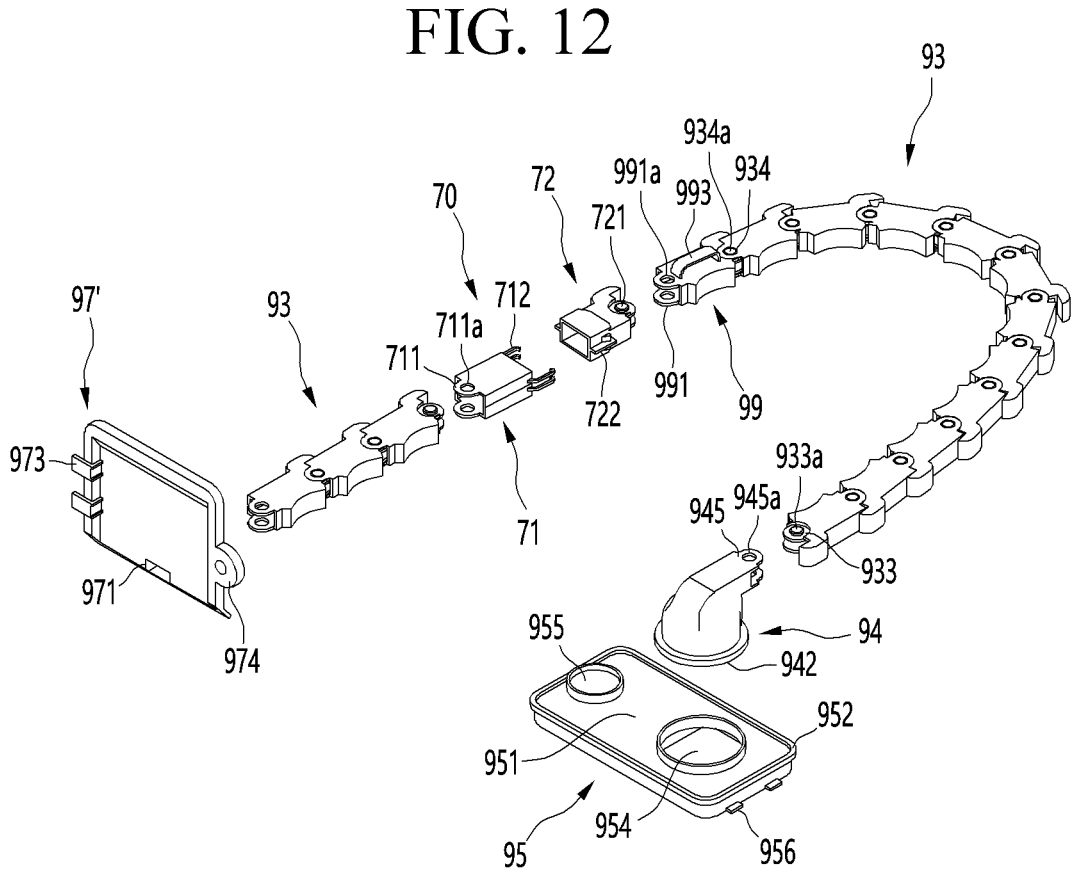
FIG. 12 is an exploded perspective view of the wire guide module when viewed from above according to another embodiment.
Figure 13:
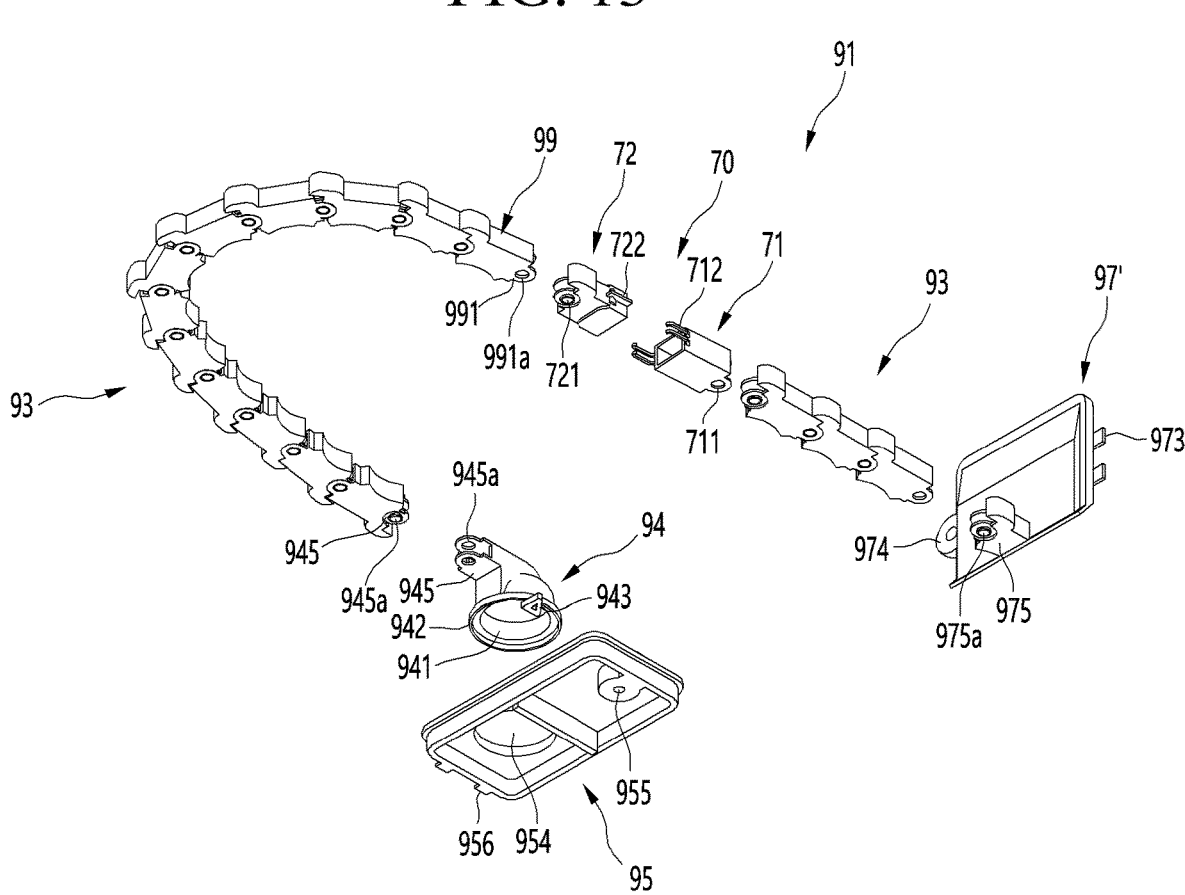
FIG. 13 is an exploded perspective view of the wire guide module when viewed from below according to another embodiment.
Figure 14:
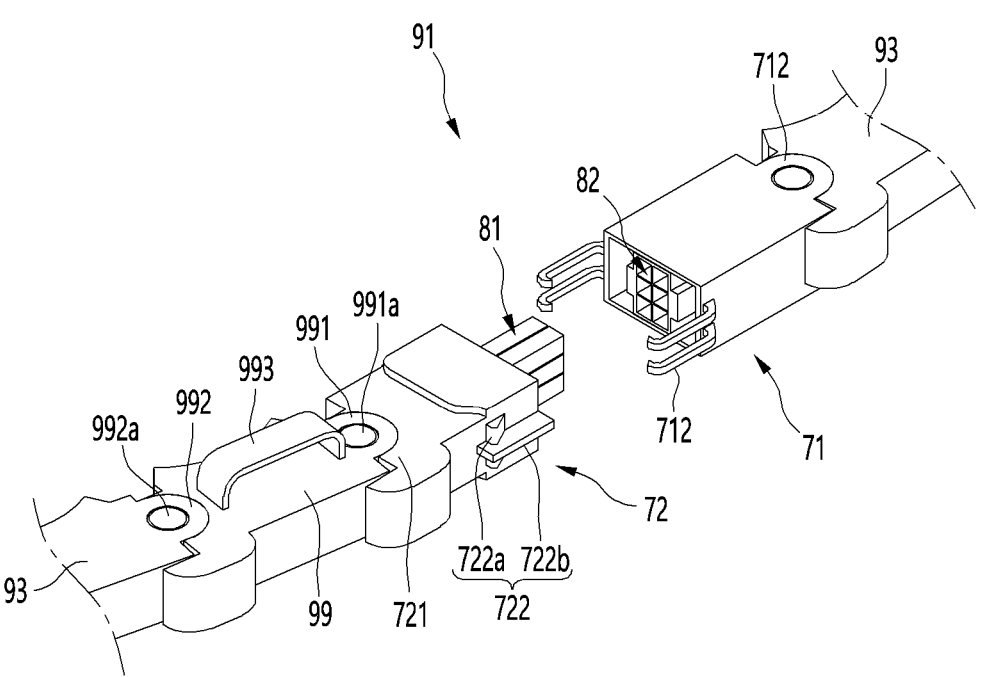
FIG. 14 is a view for explaining a process in which the wire guide module is coupled to the door portion according to another embodiment.

FIG. 11 is a view illustrating a state in which a wire guide module is mounted on a door portion according to another embodiment. Also, FIG. 12 is an exploded perspective view of the wire guide module when viewed from above according to another embodiment. Also, FIG. 13 is an exploded perspective view of the wire guide module when viewed from below according to another embodiment. Also, FIG. 14 is a view for explaining a process in which the wire guide module is coupled to the door portion according to another embodiment.

A wire guide module 91 according to another embodiment includes a mounting plate 95 fixed to a bottom surface of a storage space 12, a rotation connection member 94 coupled to the mounting plate 95, a guide head 97' fixed to a rear surface of a door portion 31, and a connecting member 93 connected to the rotation connection member 94.

The wire guide module 91 according to the other embodiment may further include a drawer fixing portion 99.

The mounting plate 95, the rotation connection member 94, the connecting member 93, and the drawer fixing portion 99 are the same as the mounting plate 95, the rotation connection member 94, and the connecting member 93, which are described according to the foregoing embodiment, and thus, the detailed description there will be omitted.

The wire guide module 91 according to another embodiment is characterized by including a connection portion 70 provided between the connecting members 93.

The connection portion 70 may be provided between one end of one of the connecting members 93 and one end of the other one of the connecting members 93.

In detail, the connection portion 70 may be provided on a linear section S1 connected to the guide head 97'. For example, the plurality of connecting members 93 may be connected to a rear surface of the guide head 97', and the connection portion 70 may be connected to a rear end of the connecting member 93 connected to the guide head 97'.

The connection portion 70 has a structure in which a first connector 71 and a second connector 72 are detachably connected to each other.

That is, the wire guide module 91 according to another embodiment may be detachably connected to the door portion 31 by the connection portion 70.

In detail, the connection portion 70 includes a first connector 71 connected to one end of the connecting member 93 connected to the guide head 97' and a second connector 72 detachably coupled to the first connector 71. One end of the second connector 72 may be connected to one end of the connecting member 93.

The first connector 71 and the second connector 72 may have structures that are conflicted with each other so as to be detached from each other, and one end of the first connector 71 and one end of the second connector 72 may be connected to the connecting member 93.

In addition, each of the first connector 71 and the second connector 72 have a hollow therein, and front and rear surfaces of the first and second connectors 71 and 72 may be opened so that a wires is accommodated therein.

For example, a first connector connection portion 711 extending forward may be disposed on each of upper and lower ends of the first connector 71. The first connector connection portion 711 may have the same structure as the front connection portion 934 of the connecting member 93.

An opened connection hole 711a may be defined in a center of the first connector connection portion 711, and a rear protrusion 933a of the connecting member 93 may be inserted into the opened connection hole 711a.

A first connector coupling portion 712 extending in a direction of the second connector 72 may be disposed on a rear end of the first connector 71 so as to be coupled to the second connector 72.

The first connector coupling portion 712 may have a structure that is restricted to be hooked with the second connector coupling portion 722 disposed on the second connector 72.

A door connector 82 connected to wires of electric components inside the door portion 31 may be accommodated inside the first connector 71.

A second connector connection portion 721 extending backward may be disposed on each of upper and lower ends of a rear end of the second connector 72. The second connector connection portion 721 may have the same structure as the rear connection portion 933 of the connecting member 93.

A protrusion 721a may be disposed on each of a top surface and a bottom surface of the second connector connection portion 721. The protrusion 721a may be inserted into a connection hole 991a defined in the drawer fixing portion 99.

Alternatively, the second connector connection portion 721 may be inserted into the connection hole 934a of the connecting member 93 adjacent to the drawer fixing portion 99.

That is, the connection portion 70 may be connected to one end of the connecting member 93 adjacent to the drawer fixing portion 99 or to one end of the drawer fixing portion 99. In this case, since the drawer fixing portion 99 is fixed below the drawer portion 32, the operator may easily check the position of the second connector 72. Thus, the first connector 71 and the second connector 72 may be more easily attached from and detached to each other.

A second connector coupling portion 722 coupled to the first connector connection portion 711 may be disposed on a front end of the second connector 72. The second connector coupling portion 722 may have a structure in which the first connector coupling portion 712 is restricted to be hooked. For example, a vertical portion 722a and a horizontal portion 722b may be disposed on a side surface of the second connector 72 to cross each other. Also, each of the plurality of first connector connection portions 711 may be restricted to be hooked with the vertical portion 722a.

A main connector 81 connected to the wires of the electric components inside the cabinet 10 may be accommodated inside the second connector.

When the first connector 71 and the second connector 72 are coupled to each other, the door connector 82 and the main connector 81 may be coupled and electrically connected to each other.

Due to this structure, in a state in which the door portion 31 and the drawer portion 32 are coupled to each other, the operator may put his or her hand under the drawer portion 32 to couple the first connector 71 to the second connector 72. The first and second connectors 72 may be coupled to electrically connect the wires inside the door to the electric components inside the cabinet 10.

In the wire guide module 91 according to another embodiment, the connecting member 93 may be directly connected to the guide head 97'.

In detail, the guide head 97' according to another embodiment includes a guide connecting portion 975 to be connected to the connecting member 93. The guide connecting portion 975 may be disposed to extend backward from a rear surface of the guide head 97'. A connection protrusion 975a coupled to the connecting member 93 may be disposed on each of upper and lower ends of the guide connecting portion 975.

The connection protrusion 975a may protrude upward or downward from each of the upper and lower ends of the guide connecting portion 975 to provide a pair. The connection protrusion 975a may be inserted into the connection hole 945a of the connecting member 93.

In addition, the guide head 97' may further include a door coupling portion 973 coupled to the door portion 31 at one end thereof. The door coupling portion 973 may be inserted into the door portion 31 and then restricted to be hooked with the door portion 31.

The guide head 97' may have a through-hole 974, through which a coupling member coupled to the door portion 31 passes, in the other end thereof. The guide head 97' may be mounted on a rear surface of the door portion 31 by the door coupling portion 973 and the through-hole 974.

The wire guide module 91 according to another embodiment may further include a drawer fixing portion 99. The drawer fixing portion 99 may be provided between the connecting members 93. A connection rib 993 may be disposed on an upper end of the drawer fixing portion 99. The connection rib 993 may be restricted to be hooked with a hook portion 321 provided below the drawer portion 32. The wire guide module 91 may be prevented from being separated while the door 30 is drawn in and out by the drawer fixing portion 99.

The drawer fixing portion 99 may be disposed adjacent to the connection portion 70. In a state in which the door portion 31 and the drawer portion 32 are coupled to each other, the operator may put his/her hand under the drawer portion 32 to couple or separate the first connector 71 to/from the second connector 72. Here, in the state in which the drawer fixing portion 99 is fixed to the hook portion 321, the first connector 71 and the second connector 72 may be detached from each other so that assembly is easier.

The refrigerator according to the embodiment may include the wire guide module that guides the cabinet-side wire toward the door, and the connecting member or the guide head, which constitutes the wire guide module, and the connection portion may be separably coupled to each other. Thus, the wire guide module may be connected to the door even when the drawer portion and the door portion, which constitute the drawer door, are coupled to each other, and thus, the assembly may be easy.

In addition, the hook portion may be disposed on the bottom surface of the drawer portion, and the wire guide module may include the drawer fixing portion restricted to be hooked with the hook portion. Thus, while the door is drawn in and out, the connecting member may be prevented from excessively rotating. In addition, the connection portion may be prevented from being separated.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a cabinet having a storage space;
a door configured to be drawn in and out of the cabinet, the door comprising (i) a door portion that defines a front surface of the door and (ii) a drawer portion that is coupled to the door portion and defines an accommodation space; and
a wire guide module configured to separably connect a wire inside the cabinet to a wire inside the door,
wherein the wire guide module comprises:
a plurality of connecting members that accommodate a wired connection between the cabinet and the door,
a first connector that is mounted to a rear surface of the door portion, the first connector comprising (i) a head body portion that is detachably mounted to the rear surface of the door portion, (ii) a head connection portion that protrudes from the head body portion and that defines an opening therein, and (iii) a door connector that is mounted in the opening of the head connection portion, and
a second connector that is coupled via the plurality of connecting members to the cabinet and accommodates a main connector connected to the wire in the cabinet, and
wherein the first connector and the second connector are configured to separably couple to each other to thereby separably connect the main connector and the door connector with each other.

2. The refrigerator according to claim 1, wherein the wire guide module further comprises a connection protrusion that protrudes from the head connection portion, and
wherein the second connector has a coupling hole into which the connection protrusion is insertable to couple the first connector and the second connector.

3. The refrigerator according to claim 1, wherein the second connector is connected to one connecting member of the plurality of connecting members.

4. The refrigerator according to claim 1, wherein the door further comprises a hook portion that protrudes downwards from the drawer portion, and
wherein the wire guide module further comprises a drawer fixing portion configured to be engaged with the hook portion.

5. The refrigerator according to claim 4, wherein the drawer fixing portion is connected to at least one of the plurality of connecting members and/or connected to the second connector.

6. The refrigerator according to claim 4, wherein the plurality of connecting members extend rearwards in a linear section from the door portion along a bottom surface of the drawer portion, and wherein the drawer fixing portion and the hook portion are disposed in the linear section.

7. The refrigerator according to claim 4, further comprising a protrusion protruding downward from a bottom surface of the drawer portion.

8. The refrigerator according to claim 1, wherein the wire guide module further comprises:
   a mounting plate mounted on an inner surface of the cabinet and including a mounting opening through which the wire of the cabinet is accessible; and
   a rotation connection member rotatably coupling the mounting plate and one of the connecting members.

9. The refrigerator according to claim 8, wherein the wire of the cabinet and/or the wired connection passes through the mounting plate and the rotation connection member.

10. The refrigerator according to claim 9, wherein the first connector and the second connector are disposed closer to the door portion than to the rotation connection member.

11. The refrigerator according to claim 1, wherein the door portion comprises:
   a panel assembly defining an outer appearance of the front surface of the door; and
   a door body coupled to a rear side of the panel assembly, wherein the panel assembly is made of a light transmissive material, and
   wherein the door portion further comprises a lighting device provided at one side of the panel assembly.

12. The refrigerator according to claim 1, wherein the wire guide module further comprises a guide head that is mounted to and protrudes from the rear surface of the door portion, the guide head comprising the first connector, and
   wherein the first connector protrudes rearward from a rear surface of the guide head.

13. The refrigerator according to claim 1, wherein the door connector is separably mounted in the opening of the head connection portion.

14. The refrigerator according to claim 1, wherein the second connector is configured to cover the door connector and the head connection portion based on the door connector being coupled to the main connector.

15. The refrigerator according to claim 2, wherein the connection protrusion is one of a plurality of connection protrusions that protrude from an upper surface and a side surface of the head connection portion.

16. The refrigerator according to claim 2, wherein the door connector passes through the opening of the head connection portion and protrudes rearward relative to the head connection portion, and
   wherein the connection protrusion protrudes upward from an upper surface of the head connection portion.

17. The refrigerator according to claim 2, wherein the door connector passes through the opening of the head connection portion and protrudes rearward relative to the head connection portion, and
   wherein the connection protrusion protrudes laterally from a side surface of the head connection portion.

18. The refrigerator according to claim 1, wherein the head body portion comprises a door coupling portion that protrudes from a first side surface of the head body portion and is inserted into the door portion.

19. The refrigerator according to claim 18, wherein the head body portion has a through-hole defined at a protrusion that is projected from a second side surface of the head body portion opposite to the first side surface and that is coupled to the door portion.

* * * * *